United States Patent [19]
Maillot et al.

[11] Patent Number: 5,933,940
[45] Date of Patent: Aug. 10, 1999

[54] METHOD OF MANUFACTURING A RECORDING/READING MATRIX MAGNETIC HEAD

[75] Inventors: Christian Maillot, Courbevoie; Marc Dorel, Massy, both of France

[73] Assignee: Thomson-CSF, Paris, France

[21] Appl. No.: 08/887,840

[22] Filed: Jul. 3, 1997

[30] Foreign Application Priority Data

Jul. 5, 1996 [FR] France ..................... 96 08393

[51] Int. Cl.$^6$ ....................................... G11B 5/42
[52] U.S. Cl. ................... 29/603.14; 29/603.24; 29/603.25
[58] Field of Search .......................... 29/603.13, 603.14, 29/603.15, 603.24, 603.25

[56] References Cited

U.S. PATENT DOCUMENTS

| | | |
|---|---|---|
| 3,839,784 | 10/1974 | Pierce ........................................ 29/603 |
| 5,392,181 | 2/1995 | Lhureau et al. ........................ 360/114 |

FOREIGN PATENT DOCUMENTS

| | | |
|---|---|---|
| 0 269 489 | 6/1988 | European Pat. Off. . |
| 0 616 316 | 9/1994 | European Pat. Off. . |
| 0 716 410 | 6/1996 | European Pat. Off. . |
| 5-81615 | 4/1993 | Japan . |
| WO 89/00327 | 1/1989 | WIPO . |

OTHER PUBLICATIONS

J.P. Lazzari, et al., "A New Thin Film Head Generation IC Head", Proceedings Of The International Magnetics Conference (INTERMAG), Washington, DC, Mar. 28–31, 1989, pp. AA–1.

Patent Abstracts of Japan, vol. 18, No. 539, (P–1812), Oct. 13, 1994 & JP6187612, Jul. 8, 1994.

*Primary Examiner*—Carl E. Hall
*Attorney, Agent, or Firm*—Oblon, Spivak, McClelland, Maier & Neustadt, P.C.

[57] ABSTRACT

A matrix type magnetic recording/reading head made in integrated fashion, including an electrically non-conductive ceramic substrate having a first main face and a second main face, each provided with connection areas. The two areas of the two faces are interconnected in sets of two by internal connection elements. A layer with high magnetic permeability is deposited on the first face of the substrate. The substrate bears a first series of row conductors and a second series of column conductors intersecting the row conductors, each conductor being connected to a connection area of the first face. Pairs of magnetic poles are located substantially at the intersection of the row conductor and column conductors, the poles of each pair separated by a gap space and being magnetically coupled to the layer with high magnetic permeability in two opposite zones defined by the intersection of a row conductor and a column conductor.

2 Claims, 3 Drawing Sheets

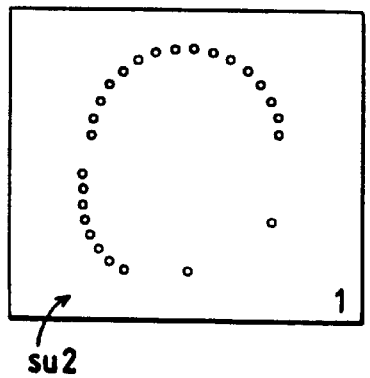
FIG.3b
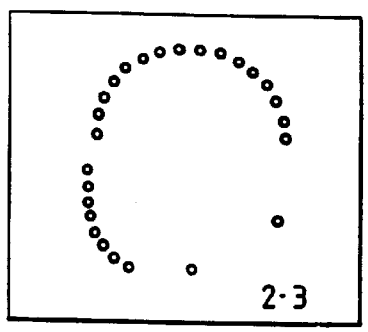
FIG.3c
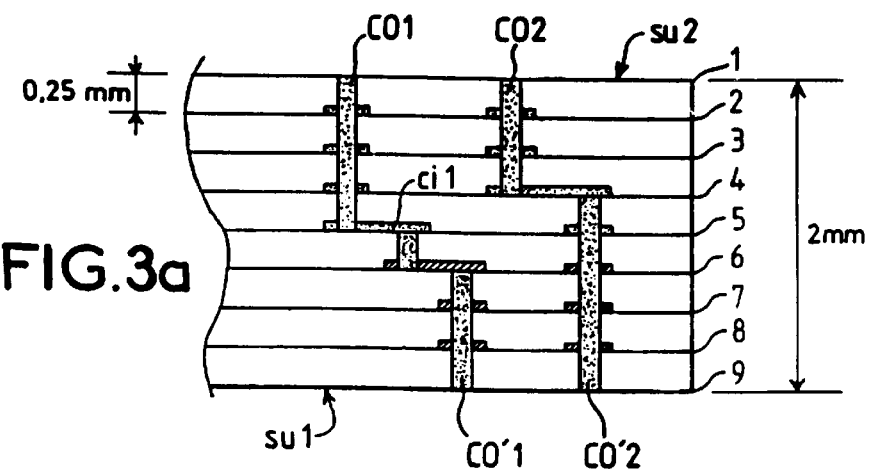
FIG.3a
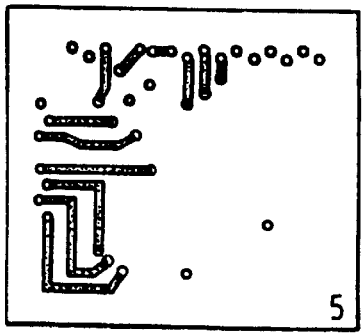
FIG.3e
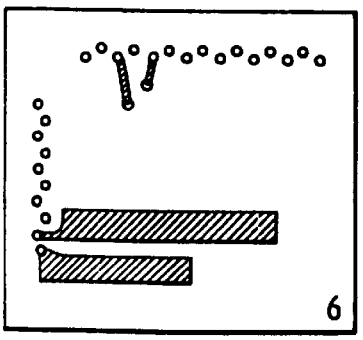
FIG.3f
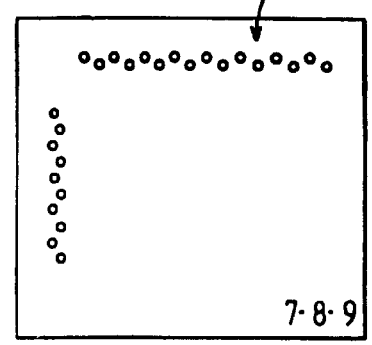
FIG.3d / FIG.3g

METHOD OF MANUFACTURING A RECORDING/READING MATRIX MAGNETIC HEAD

BACKGROUND OF THE INVENTION

The invention relates to a matrix type magnetic head for recording/reading that is applicable especially to the recording/reading of multiple-track magnetic tapes.

The French patent applications 2 630 853 and 2 648 608 describe matrix type magnetic heads for recording and reading that can be used to carry out high-density recording/reading operations on a recording medium. For example, such magnetic heads are capable of recording on up to 1,024 tracks in parallel on an 8 mm wide magnetic tape.

These matrix heads can be made by hybrid technologies combining steps of sawing, winding, bonding, and thin-layer deposition. Methods of manufacture are described for example in the French patent 2 648 940. Furthermore, these matrix heads may be obtained entirely by the deposition of thin layers, using technologies known as "integrated" technologies. With integrated technologies, the conductors are no longer wound wires but etched conductor films. A number of patents describe this technology.

A major constraint of integrated technologies is that the cost of manufacture of the heads is nearly proportional to their surface area. A major goal therefore is to reduce the surface area of the heads.

When a thin-layer matrix type reading head is made, two alternatives emerge for the connection of this head to its electronic circuitry:

Front-face connection system: wires are soldered directly to the thin-layer conductors. The excess thicknesses by this soldering precludes efficient contact between the tape and the head in the vicinity of the soldered wires. It then becomes necessary to take these solders to the exterior of the tape (on either side). The total height of the head is therefore dictated by this constraint. In certain configurations, this amounts to the considerable over-sizing of the real head.

Rear-face connection: to avoid the drawbacks of the front-face connection system, it is possible to connect the writing head to the rear face by making conductive passages (for example, via holes) in the substrate.

At present, the formation of holes in silicon substrates on an industrial scale has not been mastered.

The invention provides a solution to this problem.

SUMMARY OF THE INVENTION

The invention therefore relates to a matrix type recording/reading head comprising:

an electrically non-conductive ceramic substrate having a first main face and a second main face, each provided with connection areas, the two areas of the two faces being interconnected in sets of two by internal connection elements;

a layer with high magnetic permeability deposited on the first face of the substrate and bearing a first series of row conductors and a second series of column conductors intersecting the row conductors, each conductor being connected to a connection area of the first face;

pairs of magnetic poles located substantially at the intersection of a row conductor and a column conductor, the poles of a pair being separated by a gap space and being magnetically coupled to the layer with high magnetic permeability in two opposite zones defined by the intersection of a row conductor and a column conductor.

BRIEF DESCRIPTION OF THE DRAWINGS

The various objects and characteristics of the invention shall appear more clearly in the following description and from the appended figures, of which:

FIG. 3a shows a cross-sectional view of a substrate according to the invention;

FIG. 3b shows the face su2 of the substrate in FIG. 3a;

FIG. 3c shows the interfaces 2 and 3 of the substrate in FIG. 3a;

FIG. 3d shows the interface 4 of the substrate of FIG. 3a;

FIG. 3e shows the interface 5 of the substrate of FIG. 3a;

FIG. 3f shows the interface 6 of the substrate of FIG. 3a; and

FIG. 3g shows the interfaces 7 and 8 and the face su1 of the substrate in FIG. 3a.

DETAILED DESCRIPTION

Figure 1:
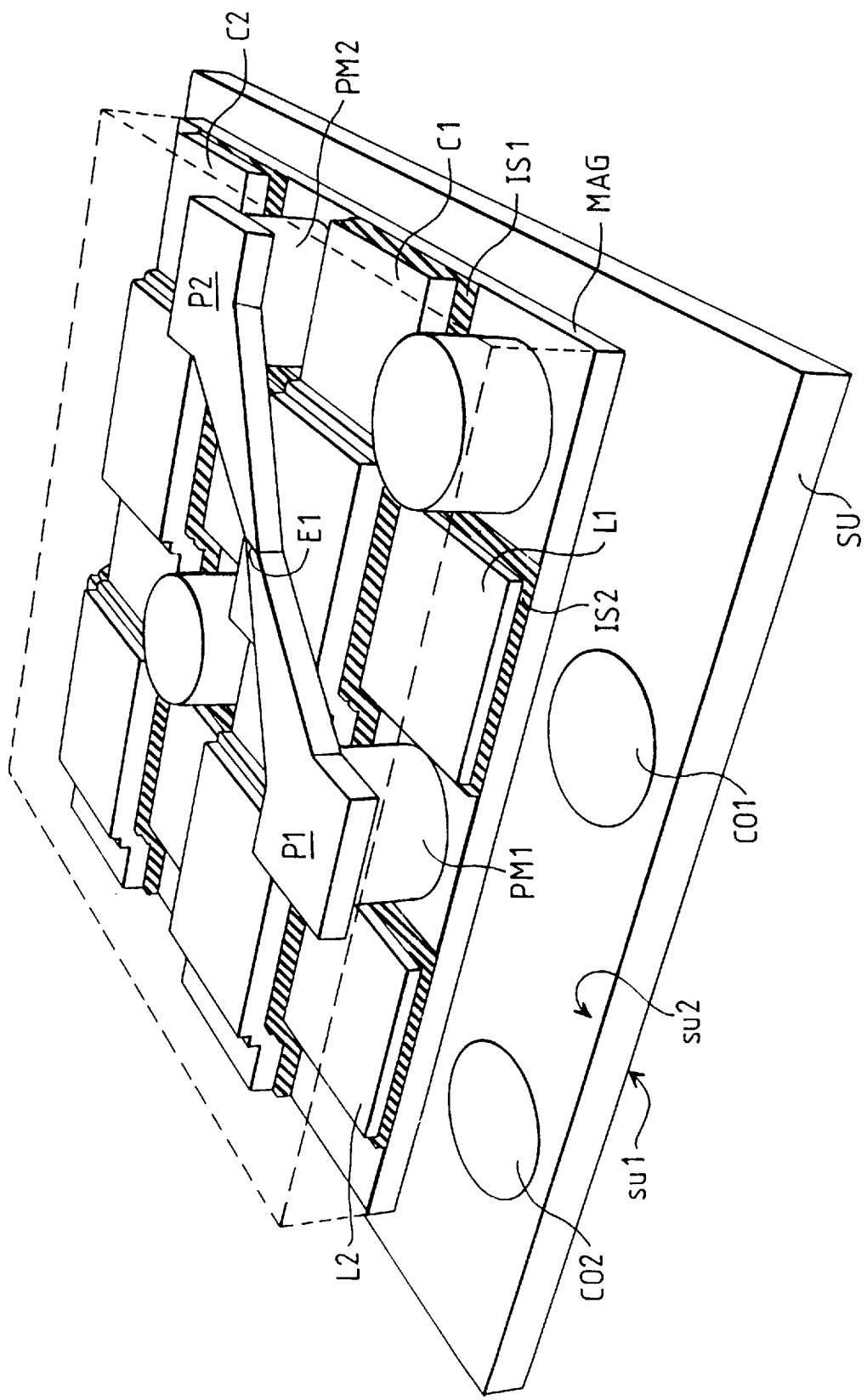
FIG. 1 shows an exemplary magnetic head according to the invention.

Referring to FIG. 1, we shall first describe an exemplary embodiment of a magnetic head according to the invention.

A substrate wafer SU made of an insulating material is covered on a face su2 with a layer MAG of material with high magnetic permeability. This layer has a first series of conductors L1, L2 (row conductors) and a second series of conductors C1, C2 (column conductors). The row conductors are not parallel to the column conductors and are separated from them by a layer of insulator IS1.

According to the example of FIG. 1, the row conductors are parallel to one another and the column conductors are parallel to one another.

If the layer MAG is conductive, an insulating layer IS2 insulates the row conductors and column conductors.

The row conductors and column conductors form points of intersection. At each point of intersection there is provided a pair of magnetic poles P1, P2. Two poles P1, P2 are separated by a gap E1. The two poles are arranged so as to be oriented substantially along a line passing above the point of intersection. The two poles are coupled with the layer MAG at two zones that are substantially symmetrical with respect to the point of intersection. Preferably, the poles P1, P2 are in contact with the layer MAG by means of magnetic pads PM1, PM2. The magnetic circuit of an elementary magnetic head is thus formed by two poles P1, P2 separated by the gap E1, the two pads PM1, PM2 and the layer MAG. The passage of an electrical current in one conductor or the other or in both the row conductor and the column conductor will therefore induce the circulation of magnetic fluxes in the magnetic circuit. Depending on the directions of the currents in the two conductors, the fluxes induced will be added together or deducted from one another.

A magnetic medium (not shown) placed in the vicinity of the gap will therefore be affected by these fluxes and could record magnetic information.

The entire magnetic head is embedded in a material that is non-magnetic and electrically insulating.

FIG. 1 shows only an elementary head (P1–P2). However, a matrix head may have several tens of row conductors and several tens of column conductors and have an elementary head at each point of intersection.

The column conductors and row conductors are connected to connection areas such as C01, C02, located on the face su2 of the substrate. In order that this connection may be made, the magnetic layer MAG does not cover these connection areas or else holes are provided in the layer MAG to access these areas.

The connection areas (C01, C02) are interconnected through the substrate SU to connection areas located on the surface su1 of the substrate. The substrate SU then has the form shown in FIGS. 2a and 2b.

Figure 2B:
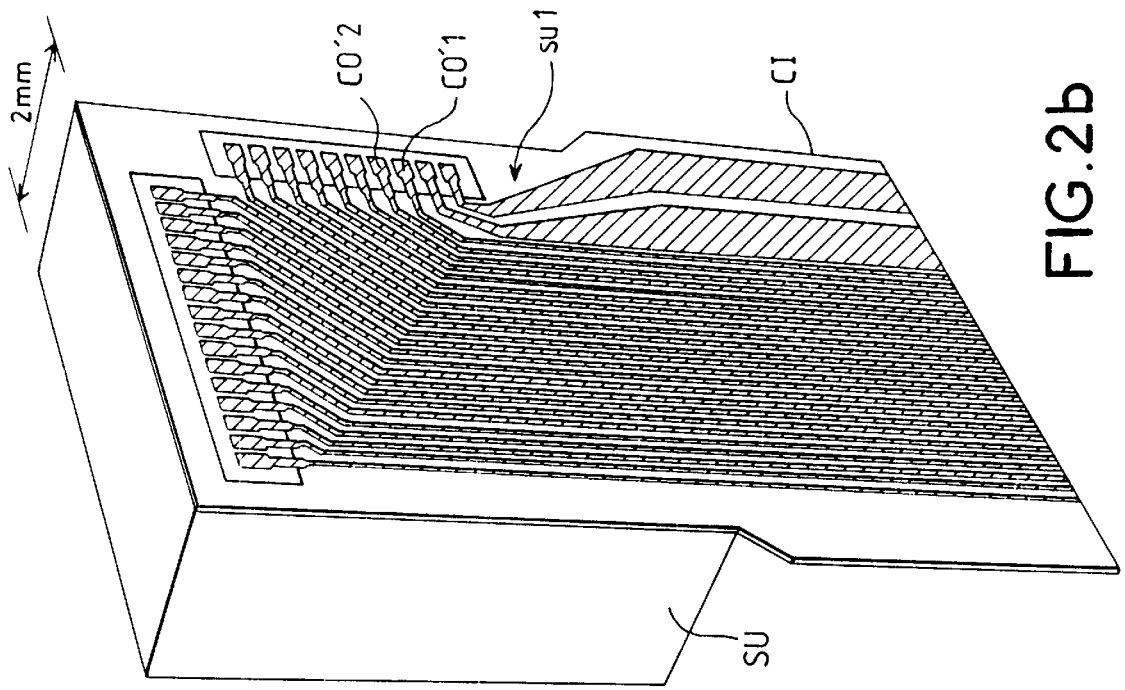
FIGS. 2a and 2b show an exemplary substrate of the magnetic head.
Figure 2A:
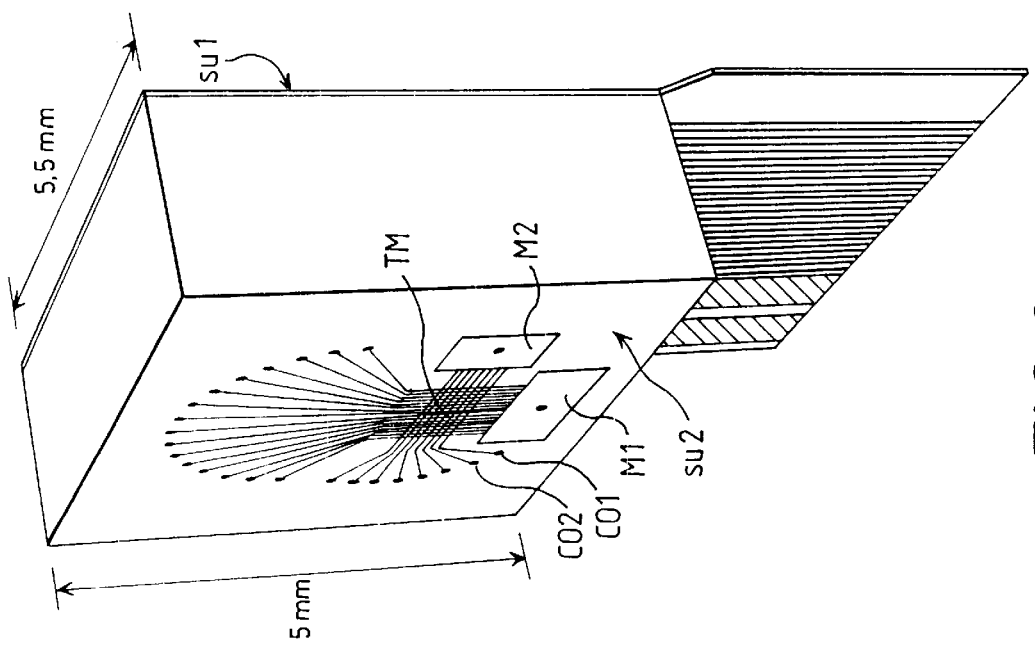

FIG. 2a shows the face su2 of the substrate. In the zone TM, there is shown the array of row conductors and column conductors on which the set of magnetic heads is made. Each row conductor and column conductor is connected to a connection area such a C01, C02. The contacts M1, M2 are the ground connections respectively common to the row conductors and to the column conductors.

FIG. 2b shows the substrate seen from the face su1 side. A wafer of printed circuits CI is connected to this face. To the connection areas of the face su1 there correspond connection areas (e.g., CO'1 and CO') connected by internal connections to the connection areas of the face su2.

Since the arrangements of the connection areas on the two faces of the substrate are not the same, it is necessary to plan for the distribution of the connections within the substrate.

FIGS. 3a to 3g show the various connection within a substrate.

FIG. 3a shows the substrate in a sectional view and brings out the fact that the substrate is a stack of layers. Each layer is crossed by as many connection elements as there are connection areas on a face. To reorganize the arrangement of the connection areas of a face with respect to the arrangement of the connection areas of the other face, internal conductors such as ci1 are provided between the different layers to enable the connection areas to be shifted.

FIGS. 3b to 3g respectively show the face su2 of the substrate, the interfaces of the different layers 2–8 of the substrate, and the face su1.

According to a preferred embodiment of the invention, the substrate is made of aluminium oxide. Each layer has a thickness of about 0.25 mm, which results in a substrate with a thickness of several millimeters (2 mm for example).

The manufacturing method comprises a first stage of making the substrate by stacking different layers of aluminium oxide and making, at each stacking step, connection elements going through each layer and conductors (ci1) enabling the connection areas to be shifted. When the substrate has been made with connection areas C0'1, C0'2 on its face su1 and connection areas CO1, CO2 on its face su2, then all of the magnetic heads are made on the face su2.

This set of magnetic heads is implemented as follows:

polishing the substrate (face su2);

making a base out of magnetic material such as sendust, permalloy, or any other alloy known for its high permeability (layer MAG);

etching the base to bring out the connection areas C01, C02;

providing electrical insulation (for example, SiO2 or polyimide) (layer IS2);

depositing and etching of a line of row conductors (L1, L2) (for example, aluminum or gold or copper);

insulating the row conductors with SiO2 or polyimide (layer IS1);

depositing and etching a line of column conductors (C1, C2);

insulating the column conductors (layer IS1);

planarization;

etching the insulating layers (IS1, IS2) up to the magnetic layer MAG;

filling the holes with a magnetic material with high magnetic permeability;

planarization;

making the poles (P1, P2) and gap (E1). These poles are made, for example, according to the technique described in the French patent No. 2 605 783.

The design of the conductors must take account of the constraints dictated by the construction of the magnetic head: for example, there must be a limited pitch between conductors (80 μm for example).

This layout also takes account of the constraints dictated by making the substrate, namely, typically there must be a pitch of 250 μm between the connection elements going through the substrate (with a diameter of 100 μm).

According to one embodiment, the substrate SU is made of a material with high magnetic permeability, for example ferrite. Therefore, there is no reason to plan for the layer MAG with high magnetic permeability.

The invention has the advantage of giving a compact, integrated rigid matrix-type magnetic head that has dependable electrical connections and costs relatively little.

What is claimed is:

1. A method for making a matrix type magnetic head, comprising the following steps:

making a substrate of insulating material having a first face with first connection areas and a second face with second connection areas, the first and second connection areas being interconnected through the substrate by internal connection elements;

forming successively, on the second face of the substrate, a layer of a material with high magnetic permeability; conductive strips of row conductors; an insulator layer; and conductive strips of column conductors not parallel to the row conductors;

drilling holes through the insulator layer to the layer with high magnetic permeability at points of intersection of selected of the row conductors and column conductors at locations substantially equidistant from the points of intersection; and providing pairs of magnetic poles, the poles of each pair being separated by a gap and being formed substantially above respective of said holes so as to be coupled with the layer of material with high magnetic permeability.

2. The method of claim 1, further comprising:

providing magnetic pads in each hole to magnetically couple the poles to the layer of material with high magnetic permeability.

* * * * *